(12) United States Patent
Pederson

(10) Patent No.: US 7,975,579 B1
(45) Date of Patent: Jul. 12, 2011

(54) SYSTEM AND METHOD FOR CUTTING TIRES

(75) Inventor: Les Pederson, Dakota City, NE (US)

(73) Assignee: Eagle International, LLC, South Sioux City, NE (US)

( * ) Notice: Subject to any disclaimer, the term of this patent is extended or adjusted under 35 U.S.C. 154(b) by 1113 days.

(21) Appl. No.: 11/789,173

(22) Filed: Apr. 24, 2007

(51) Int. Cl.
*B23B 3/00* (2006.01)

(52) U.S. Cl. .................. 82/1.11; 82/54; 83/874; 83/923; 83/951

(58) Field of Classification Search .................... 83/951, 83/923, 557, 697, 54, 870–874, 460, 184, 83/781, 743, 175, 176; 157/1.17; 82/1.11, 82/46, 54, 56
See application file for complete search history.

(56) References Cited

U.S. PATENT DOCUMENTS

| | | | | |
|---|---|---|---|---|
| 3,736,822 A | * | 6/1973 | McVaugh | 83/155.1 |
| 4,338,840 A | * | 7/1982 | Farrell et al. | 83/622 |
| 4,397,207 A | * | 8/1983 | Isaac | 83/490 |
| 4,422,581 A | * | 12/1983 | Chryst | 241/66 |
| 5,054,351 A | | 10/1991 | Jolliffe et al. | |
| 5,531,146 A | * | 7/1996 | Pederson | 83/467.1 |
| 5,555,782 A | * | 9/1996 | Pagaza-Melero et al. | 82/46 |
| 5,783,035 A | * | 7/1998 | Pederson | 156/584 |
| 5,868,328 A | * | 2/1999 | Luoma | 241/101.2 |
| 6,131,637 A | * | 10/2000 | Pederson | 157/1.17 |
| 6,240,819 B1 | | 6/2001 | Su et al. | |
| 7,497,761 B2 | * | 3/2009 | Gonzaga | 157/1.17 |
| 2002/0035908 A1 | * | 3/2002 | Kawashima et al. | 83/368 |
| 2003/0024369 A1 | * | 2/2003 | Dunn et al. | 83/733 |

* cited by examiner

*Primary Examiner* — Boyer D Ashley
*Assistant Examiner* — Omar Flores-Sánchez
(74) *Attorney, Agent, or Firm* — Holland & Hart LLP

(57) ABSTRACT

A system and method are provided for cutting scrap tires along a cut line that is generally parallel with sidewalls of the scrap tires. A base frame supports a cutting blade that is positioned to cut through the tread of a scrap tire lying on its sidewall. A blade engagement arm may be provided to at least partially receive the cutting blade from a back side of the tread portion. A motive system is provided for incrementally moving the cutting apparatus about a circumferential portion of the scrap tire as it is being cut.

15 Claims, 6 Drawing Sheets

SYSTEM AND METHOD FOR CUTTING TIRES

BACKGROUND

Due to the increase of surplus scrap tires and the rapid decrease of available landfill space and other storage areas, many new uses for scrap tires are being developed. One example of such a new use is demonstrated within U.S. Pat. No. 7,007,634, wherein large, over-the-road tires are converted into automated livestock troughs. Part of the conversion process involves cutting the scrap tire through its tread portion along a plane that is generally parallel with a sidewall of the scrap tire. FIG. 6 depicts such an over-the-road tire that has been cut through its tread portion. FIG. 7 depicts that same over-the-road tire after the top portion of the tire has been separated from the bottom portion. By cutting the scrap tire in this manner, two separate troughs, feeders or other useful products can be formed. Unfortunately, the prior art has failed to provide an automated cutting apparatus capable of cleanly and efficiently cutting large, over-the-road tires in this manner.

Common prior art tire cutters typically involve a platform that supports and rotates the scrap tire with respect to a rotating cutting blade. Such a design is clearly impractical when the scrap tire to be cut is a large over-the-road tire. Other tire cutting systems support the tire and use a fixed or rotating blade to cut repeatedly from one sidewall to the other until the tire is effectively cut into a plurality of separate sections. Again, while useful for many recycling purposes, such tire cutting systems fail to address the specific needs of cutting scrap tires through their tread portions to produce useable devices, such as depicted in FIG. 7.

Accordingly, what is needed is a novel tire cutting apparatus and method of using the same that are capable of cleanly and efficiently cutting large, over-the-road tires through their tread portion, along a plane that is generally parallel with a sidewall of the tire. Such a system, however, must be relatively simple to operate and function in a manner that does not require rotation of the tire with respect to a cutting blade.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A tire cutting apparatus is provided with a base frame, having first and second end portions and first and second side portions, which extend between the first and second end portions. A motive means is provided to depend from the first end portion of the base frame so that the motive means may engage an operating surface and enable the first end portion of the base frame to move with respect to the operating surface. A cutting blade is operatively coupled with the base frame so that the cutting blade may be moved with respect to the base frame. An optional drive means may be operatively coupled with the second end portion of the base frame to selectively engage a sidewall of a scrap tire and propel the cutting apparatus with respect to the scrap tire. A blade engagement arm may also be provided at the second end portion of the base frame such that a distal end portion of the blade engagement arm may be moved into a cutting position with respect to the base frame.

In use, the second end portion of the cutting apparatus is placed closely adjacent the tread portion of a scrap tire, engaging the drive means with the sidewall portion of the scrap tire and engaging the motive means with an operating surface. The cutting blade is then actuated so that a cutting edge of the cutting blade engages and cuts a portion of the tread portion of the scrap tire. The cutting blade may then be actuated so that the cutting edge is disengaged with the tire. An operator then actuates the drive means to move the cutting apparatus along a circumference of the tire. The cutting blade may then be actuated again so that the cutting edge of the cutting blade engages and cuts a second portion of the tread portion of the tire. This process may be repeated until a cut line has been formed through the tread portion of the scrap tire, generally parallel with a sidewall portion of the scrap tire.

It is therefore a principal object of the present invention to provide a tire cutting apparatus and method of use that effectively cuts scrap tires through their tread portions, along a plane that is generally parallel with the sidewall of the scrap tires.

A further object of the present invention is to provide a system for cutting tires and method of using the same that is incrementally moved about a circumference of a scrap tire as the scrap tire is being cut.

Still another object of the present invention is to provide a system for cutting scrap tires and method of using the same that employs a reciprocally moving cutting blade that incrementally cuts the scrap tires along their tread portion.

Yet another object of the present invention is to provide a system for cutting scrap tires and method of using the same that employ drive and motive means that allow the system to be "driven" about a circumferential portion of the scrap tire as the scrap tire is being cut.

A further object of the present invention is to provide a system for cutting scrap tires and method of using the same that provide a pivotable blade engagement arm that positions itself within the scrap tire, closely adjacent a rearward portion of the tire tread, to at least partially receive a reciprocal cutting blade as it is passed through a tread portion of the scrap tires.

Still another object of the present invention is to provide a system for cutting scrap tires and method of using the same that is relatively simple to manufacture and operate.

Yet another object of the present invention is to provide a system for cutting scrap tires that is relatively durable to promote a long useable life.

These and other objects of the present invention will be apparent after consideration of the Detailed Description and Figures herein.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
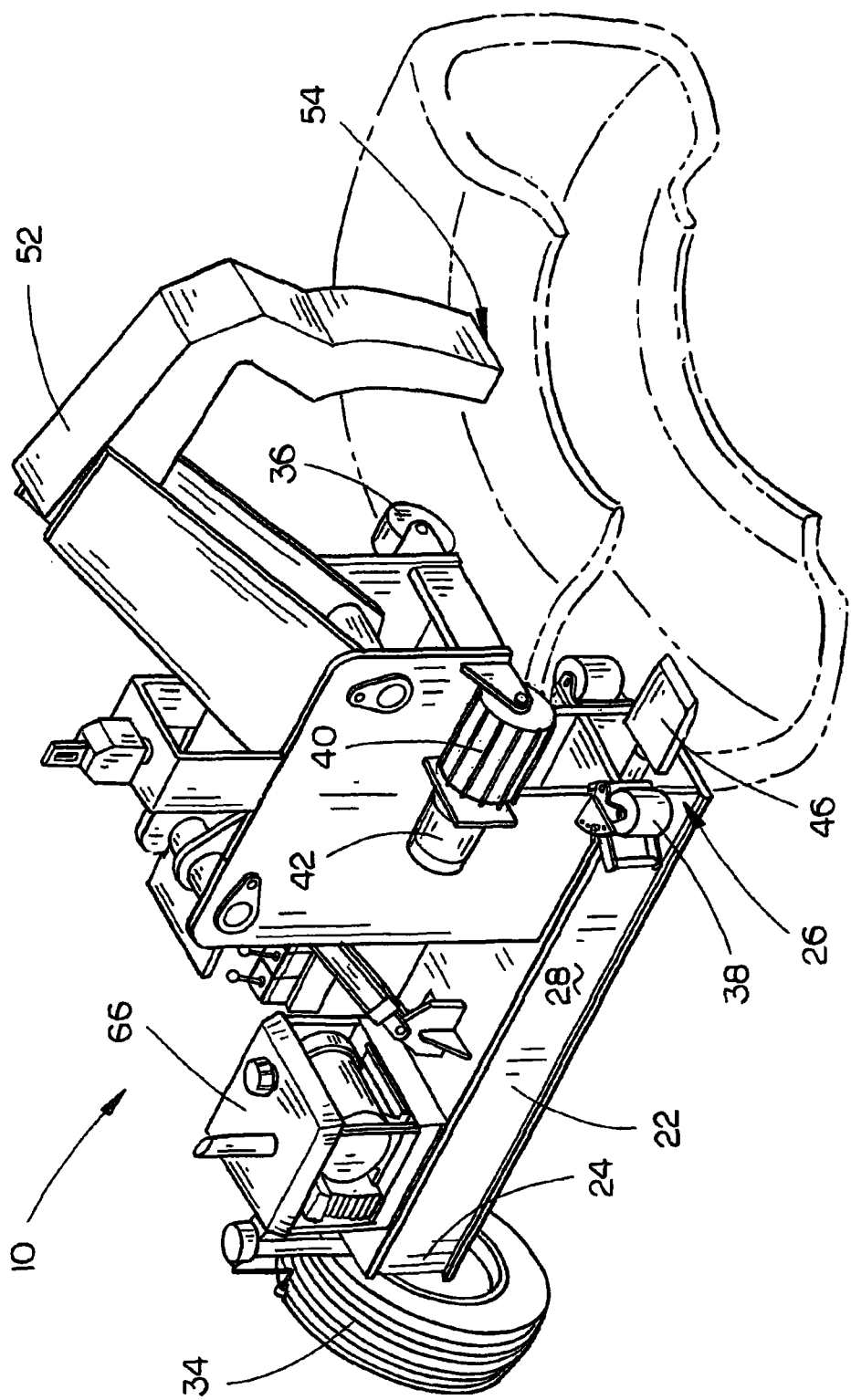
FIG. 1 depicts a perspective view of one embodiment of the system for cutting tires of the present invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The cutting apparatus 10 of the present invention is generally provided for cutting tires of nearly any size, shape or originally intended use. However, one preferred tire that may be cut using the cutting apparatus 10 is a large, over-the-road tire 12, such as that depicted in FIG. 6. As with most common tires, the over-the-road tire 12 will have at least a tread portion 14 and a first sidewall portion 16 depending from a peripheral edge of the tread portion 14. An open center portion 18, within the sidewall portion 16, provides access to a rearward wall portion 20 of the tread portion 14.

In at least one preferred embodiment, the cutting apparatus 10 is provided with a base frame 22, having a first end portion 24, second end portion 26 and first and second side portions 28 and 30, which extend between the first and second end portions 24 and 26. In at least one embodiment, the second end portion 26 of the base frame 22 may be formed to have a notch or recess 32 formed therein. The recess 32 is preferably shaped and sized to approximate an area where the tread portion 14 and sidewall portion 16 of the over-the-road tire 12 meet.

A motive means is preferably provided to depend from the first end portion 24 of the base frame 22 so that the motive means may engage an operating surface, such as the ground, and enable the first end portion 24 to move with respect to the operating surface. In one preferred embodiment, a free rotating wheel 34 may be operatively coupled with the first end portion 24 to provide the motive means. It is contemplated, however, that other structural arrangements, such as a tread system utilized by snowmobiles and the like, may be used to provide the motive means. Regardless, it will be desirable for the motive means to elevate the base frame 22 above the operating surface and enable the user to freely move the base frame 22.

In order to provide motive support to the second end portion 26 of the base frame 22, one or more upper rollers 36 and side rollers 38 may be provided, such as depicted in FIG. 1. In a preferred embodiment, the one or more upper rollers 36 will be positioned to engage the sidewall portion 16 of the tire 12 in order to support the second end portion 26 of the base frame 22 above the operating surface. The one or more side rollers 38 should be positioned to engage the tread portion 14 of the tire 12 when the tire 12 is in a cutting position within the recess 32. The one or more upper rollers 36 and side rollers 38 work with the wheel 34 to enable a user to move the cutting apparatus 10 around a circumference of the tire 12.

While it is contemplated that a user could manually position and reposition the cutting apparatus 10 around the circumference of the tire 12, one or more drive means may be operatively coupled with the base frame 22 in order to selectively propel the cutting apparatus 10 with respect to the tire 12 and the operating surface. In one preferred embodiment, the drive means is provided by a drive roller 40 that may be coupled with the second end portion 26 of the base frame 22 in a manner similar to that described for an upper roller 36. Motor 42 should be associated with the drive roller 40 for selective actuation thereof. A plurality of teeth 44 or other friction enhancing structures may be provided to the exterior surface of the drive roller 40 in order to increase the effectiveness of the drive roller 40 in engaging the sidewall portion 16 of the tire 12 and propelling the cutting apparatus 10 about the circumference of the tire 12. It is also contemplated, however, that the drive means may be provided by associating a motor with the motive means in order to selectively move the cutting apparatus 10.

A cutting blade 46 is operatively coupled with the base frame 22 and positioned to engage the tread portion 14 of the tire 12 when the cutting apparatus 10 and tire 12 are in the aforementioned cutting position. In one preferred embodiment, the cutting blade 46 is provided to be moved reciprocally with respect to the base frame 22, transverse with the first and second end portions 24 and 26. Power cylinder 48 may be associated with the cutting blade 46 to provide the desired reciprocal motion. It will merely be desirable that the cutting blade 46 be capable of engagement with the tread portion 14 in a manner that causes a cutting edge 50 of the cutting blade 46 to be positioned longitudinally with a long axis of the tread portion 14 of the tire 12 so that the tire 12 is cut along a plane that is generally parallel with the sidewall portion 16.

Figure 2:
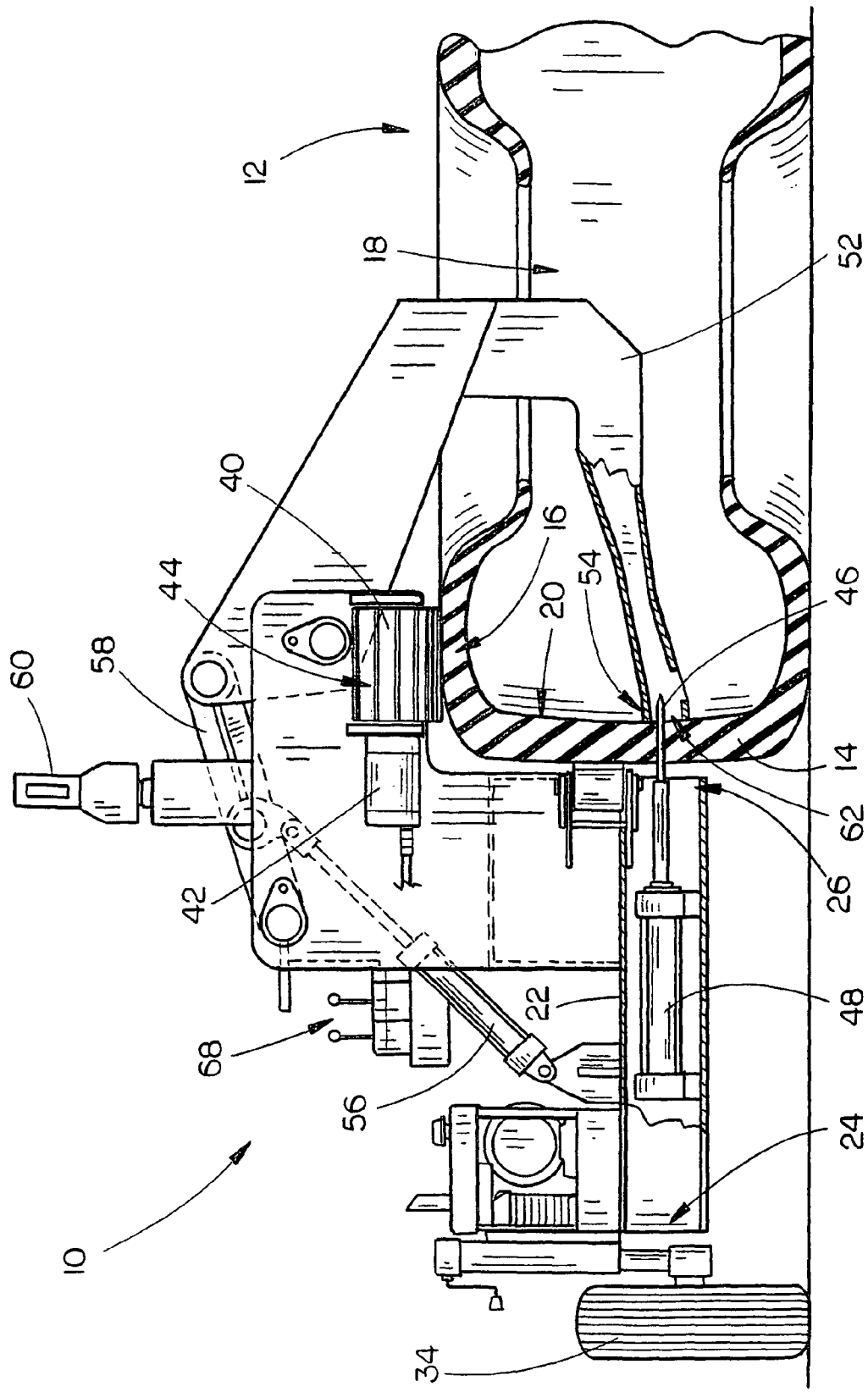
FIG. 2 depicts a side elevation view of the system for cutting tires depicted in FIG. 1 and demonstrates one manner in which the system may be engaged with a tire in a use position.
Figure 3:
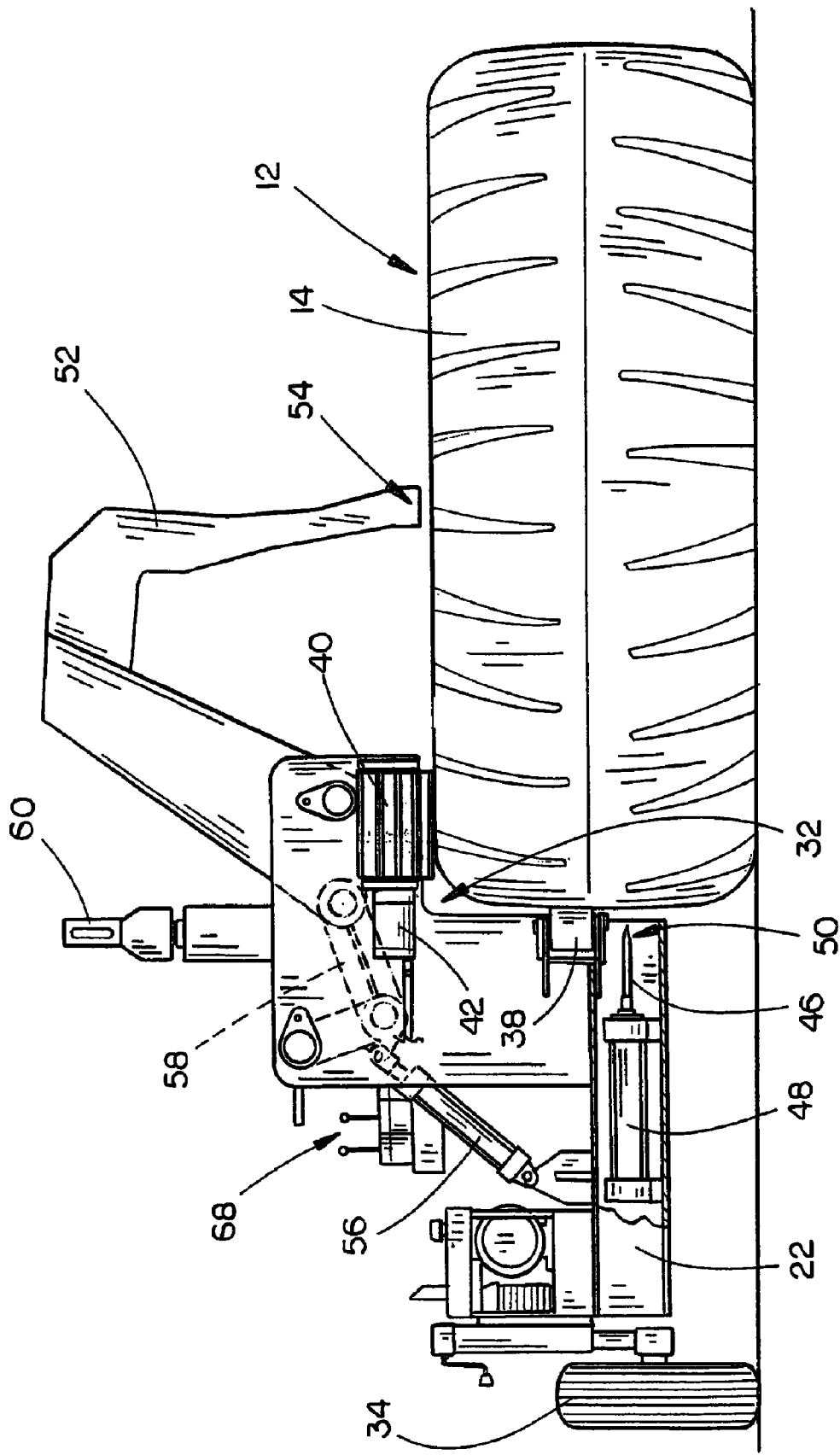
FIG. 3 depicts a partial, cut-away view of the system for cutting tires depicted in FIG. 2 and demonstrates one preferred manner in which the system may be used to cut a tire.
Figure 4:
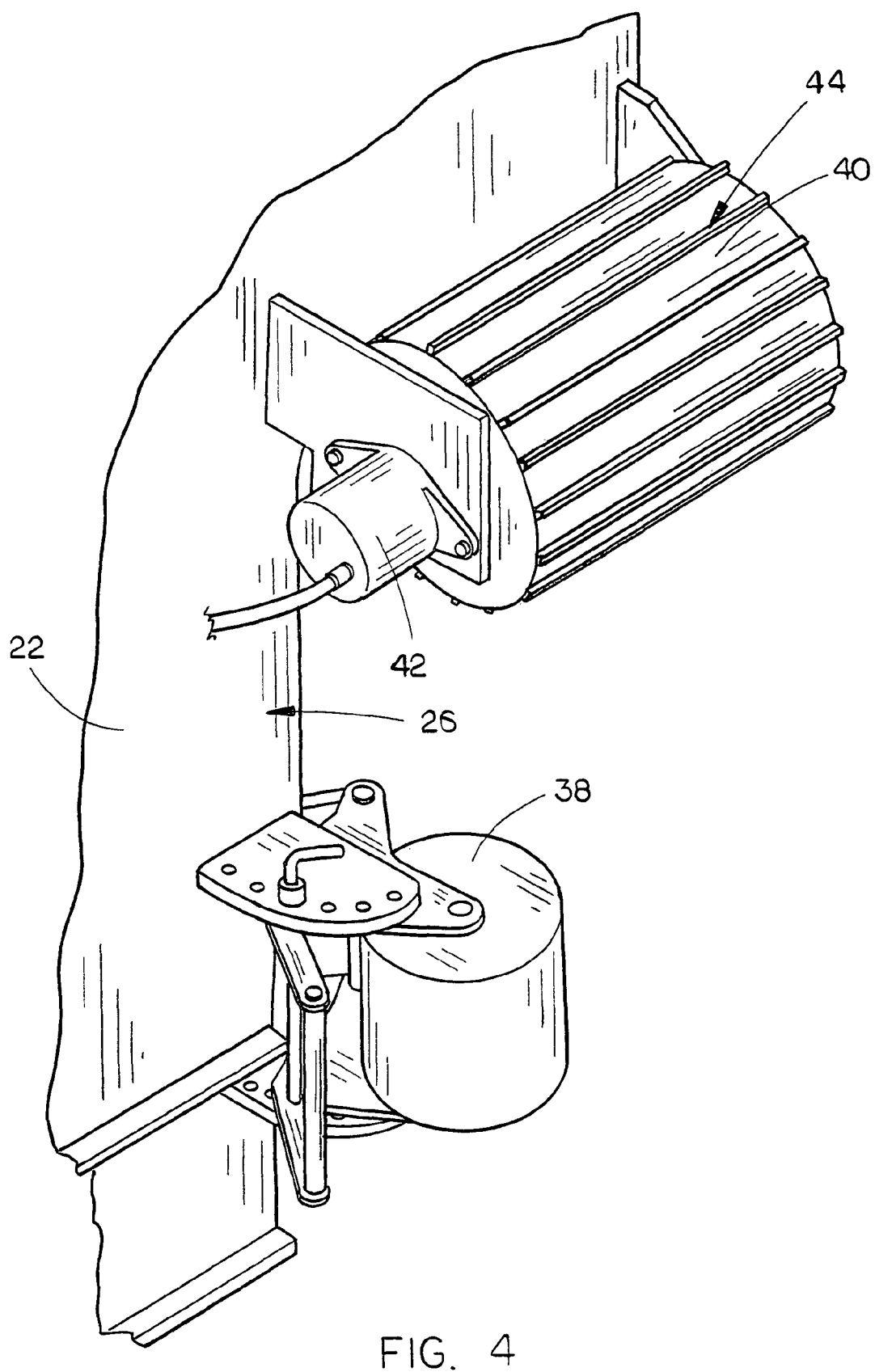
FIG. 4 depicts a front, elevation view of the system for cutting tires depicted in FIG. 2.
Figure 5:
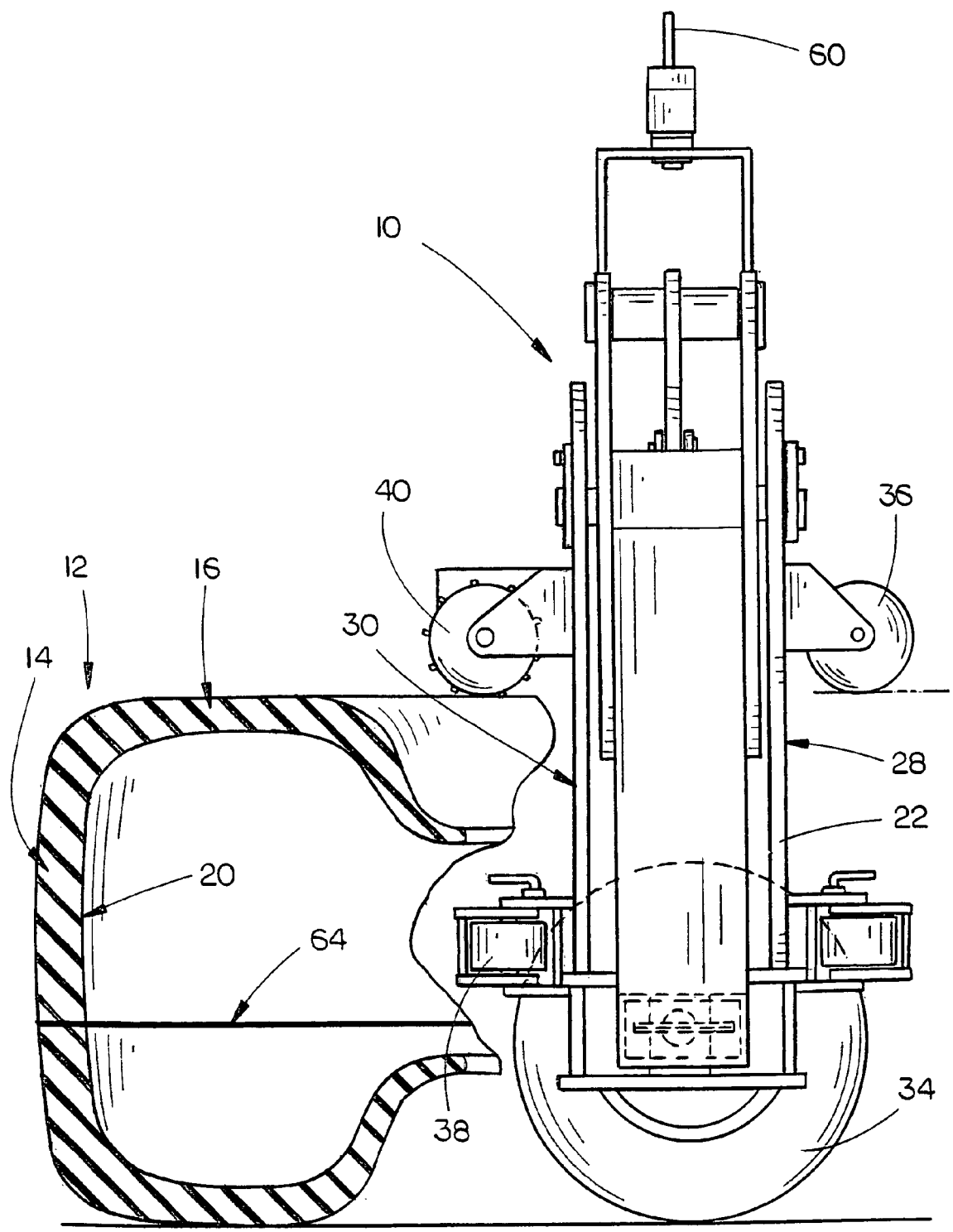
FIG. 5 depicts a partial, isometric view of one preferred embodiment of a drive system that may be used with the system for cutting tires of the present invention.

In at least one preferred embodiment, the cutting apparatus 10 may be provided with a blade engagement arm 52 that is pivotably coupled with the second end portion 26 of the base frame 22 so that a distal end portion 54 of the blade engagement arm 52 may be pivoted through the open center portion 18 of the tire 12 until it is closely adjacent the rearward wall portion 20. This position, depicted in FIG. 2, may be referred to as its cutting position. The blade engagement arm 52 should then be capable of being moved into an open position, wherein the distal end portion 54 of the blade engagement arm 52 is positioned outwardly from the open center portion 18 of the tire 12, such as depicted in FIG. 3. Power cylinder 56 and linkage 58 may be associated with the blade engagement arm 52 so that the user may selectively move the blade engagement arm between its cutting and open positions.

Figure 6:
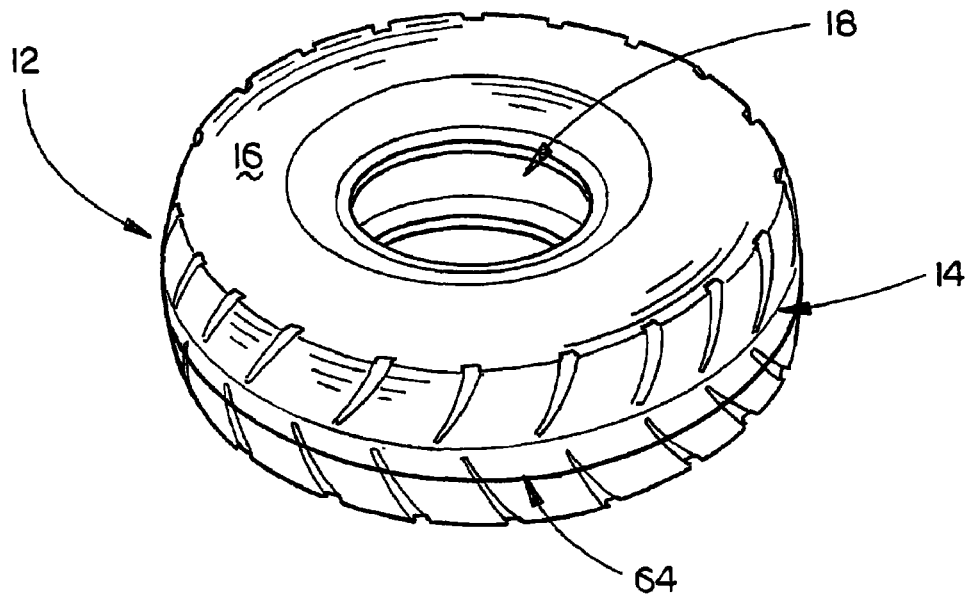
FIG. 6 depicts one type of tire that may be cut by the system and method of the present invention.
Figure 7:
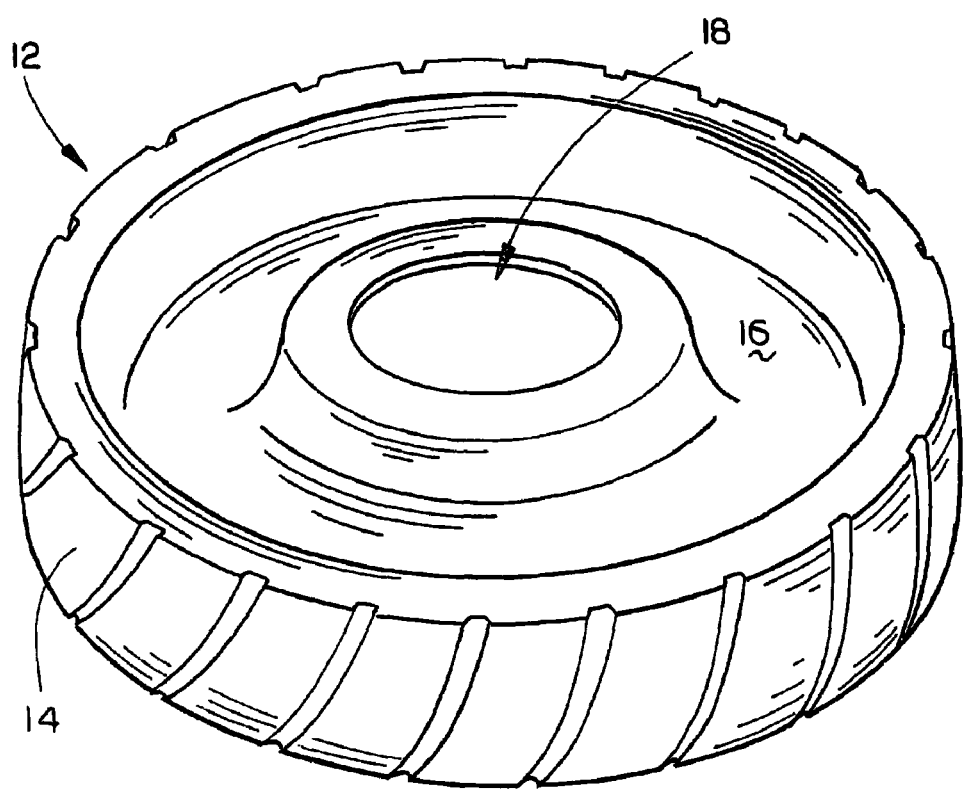
FIG. 7 depicts one portion of the tire depicted in FIG. 6 after being cut by one preferred embodiment of the system and method of the present invention.

In use, the cutting apparatus 10 is placed in its cutting position closely adjacent a tire 12, which is resting on its side on an operating surface. A coupling 60 may be operatively coupled with the base frame 22 in a location that will enable a user to couple a hoist or crane (not depicted) therewith to move the cutting apparatus 10 into and out of its cutting position with respect to the tire 12. Once the cutting apparatus 10 is in its cutting position, the blade engagement arm 52 may be pivoted into its cutting position so that the distal end portion 54 is positioned closely adjacent the rearward wall portion 20 of the tire 12. The user may then actuate the cutting blade 46 so that the cutting edge 50 engages and cuts a portion of the tread portion 14 of the tire 12. In one preferred embodiment, at least a portion of the cutting blade 46 will be received within a recess 62 formed in the distal end portion 54 of the blade engagement arm 52. It will be seen from FIG. 2 that the distal end portion 54 of the blade engagement arm 52 will further serve to substantially limit deflection of the tread portion 14 as the cutting blade 46 is passed therethrough. Once the cutting blade 46 has cut the tread portion 14, the cutting blade 46 may be actuated so that it is disengaged with the tire 12. The user may then actuate the drive means to move the cutting apparatus 10 along a circumference of the tire 12 a distance equal to or less than a length of the cutting edge 50 of the cutting blade 46. The cutting blade 46 may then be actuated once again so that the cutting edge 50 engages and cuts a second portion of the tread portion 14 of the tire 12. The process of actively engaging and disengaging the cutting blade with the tread portion 14 of the tire 12 and repositioning the cutting apparatus 10 with the drive means is repeated until the tire 12 is cut into at least two separate pieces. FIG. 6 depicts the tire 12 with a completed cut line 64. FIG. 7 depicts a lower portion of the tire 12 once the upper portion has been removed therefrom.

It is contemplated that power cylinders 48 and 56 may be powered using hydraulics or other suitable means, which may be provided from a remote power generation system or a localized unit 66. Operator control 68 may be associated with the cutting apparatus 10 to enable a user to selectively actuate the power cylinders 48 and 56 as well as the motor 42.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. A method of cutting tires, the method comprising:
providing a tire, having at least a tread portion and a first sidewall portion, having an open center portion; said tread portion depending from a peripheral edge of said sidewall portion;
providing a cutting apparatus with a base frame, having first and second end portions and first and second side portions, which extend between said first and second end portions; motive means depending from said first end portion so that said motive means may engage an operating surface and enable the first end portion of said base frame to move with respect to said operating surface; a cutting blade, operatively coupled with said base frame so that said cutting blade may be moved reciprocally with respect to said base frame, transverse with said first and second end portions; drive means operatively coupled with the second end portion of said base frame to selectively engage a portion of said tire and propel said cutting apparatus with respect to said tire;
positioning the second end portion of said cutting apparatus closely adjacent the tread portion of said tire, engaging said drive means with the sidewall portion of said tire and engaging said motive means with said operating surface; and
actuating said cutting blade so that a cutting edge of said cutting blade engages and cuts a portion of the tread portion of said tire.

2. The method of claim 1 further comprising:
actuating said cutting blade so that the cutting edge is disengaged with said tire;
actuating said drive means to move said cutting apparatus along a circumference of said tire; and
actuating said cutting blade so that a cutting edge of said cutting blade engages and cuts a second portion of the tread portion of said tire.

3. The method of claim 2 further comprising:
repeatedly actuating said cutting blade and drive means according to the steps of claim 2 until said tire is cut into at least two separate pieces.

4. The method of claim 3 wherein a length of the cutting edge of said cutting blade is positioned longitudinally with a long axis of the tread of said tire so that said tire is cut along a plane that is generally parallel with the first sidewall of said tire.

5. The method of claim 1, further comprising:
providing said cutting apparatus with a blade engagement arm, such that said blade engagement arm is operatively coupled with the second end portion of said base so that a distal end portion of said blade engagement arm may be moved with respect to said base frame; and
engaging the distal end portion of said blade engagement arm closely adjacent a rearward surface of the tread portion of said tire prior to actuating said cutting blade.

6. The method of claim 5 wherein said blade engagement arm is pivotably coupled with said base frame so that said blade engagement arm may be selectively pivoted between a cutting position, wherein the distal end portion of said blade engagement arm is positioned within the open center portion of said tire, closely adjacent the rearward surface of the tread portion of said tire, and an open position, wherein the distal end portion of said blade engagement arm is positioned outwardly from the open center portion of said tire.

7. The method of claim 6 wherein positioning said blade engagement arm in said cutting position substantially limits inward deflection of the tread portion of said tire when said cutting blade engages said tread portion.

8. The method of claim 6 wherein the distal end portion of said blade engagement arm is provided with an opening that receives at least a portion of the cutting edge of said cutting blade when said cutting blade cuts the tread portion of said tire.

9. The method of claim 6 wherein said motive means is comprised of a wheel, rotatably coupled with the first end portion of said base frame.

10. The method of claim 6 wherein said drive means is comprised of at least one roller that is rotatably coupled with the second end portion of said base frame and a motor that may be selectively engaged to rotate said roller.

11. The method of claim 10 wherein said roller is provided with a plurality of teeth that engage the first sidewall of said tire as said drive means is engaged.

12. A method of cutting tires, the method comprising:
providing a tire, having at least a tread portion and a first sidewall portion, having an open center portion; said tread portion depending from a peripheral edge of said sidewall portion;
providing a cutting apparatus with a base frame, having first and second end portions and first and second side portions, which extend between said first and second end portions;
motive means depending from said first end portion so that said motive means may engage an operating surface and enable the first end portion of said base frame to move with respect to said operating surface; and a cutting blade, operatively coupled with said base frame so that said cutting blade may be selectively moved with respect to said base frame;
positioning the second end portion of said cutting apparatus closely adjacent the tread portion of said tire and engaging said motive means with said operating surface;

actuating said cutting blade so that a cutting edge of said cutting blade engages and cuts a portion of the tread portion of said tire;

actuating said cutting blade so that the cutting edge is disengaged with said tire;

moving said cutting apparatus along a circumference of said tire;

actuating said cutting blade so that a cutting edge of said cutting blade engages and cuts a second portion of the tread portion of said tire; and repeatedly actuating said cutting blade and moving said cutting apparatus until said tire is cut into at least two separate pieces.

13. The method of claim 12 further comprising:

providing said cutting apparatus with a blade engagement arm, which is pivotably coupled with said base frame so that said blade engagement arm may be selectively pivoted between a cutting position, wherein a distal end portion of said blade engagement arm is positioned within the open center portion of said tire, closely adjacent the rearward surface of the tread portion of said tire, and an open position, wherein the distal end portion of said blade engagement arm is positioned outwardly from the open center portion of said tire.

14. The method of claim 13 wherein the distal end portion of said blade engagement arm is provided with an opening that receives at least a portion of the cutting edge of said cutting blade when said cutting blade cuts the tread portion of said tire.

15. The method of claim 13 wherein a length of the cutting edge of said cutting blade is positioned longitudinally with a long axis of the tread of said tire so that said tire is cut along a plane that is generally parallel with the first sidewall of said tire.

* * * * *